Sept. 7, 1943.  E. O. WHITE  2,328,936
EMERGENCY EXIT BOLT
Filed July 16, 1941  2 Sheets-Sheet 1
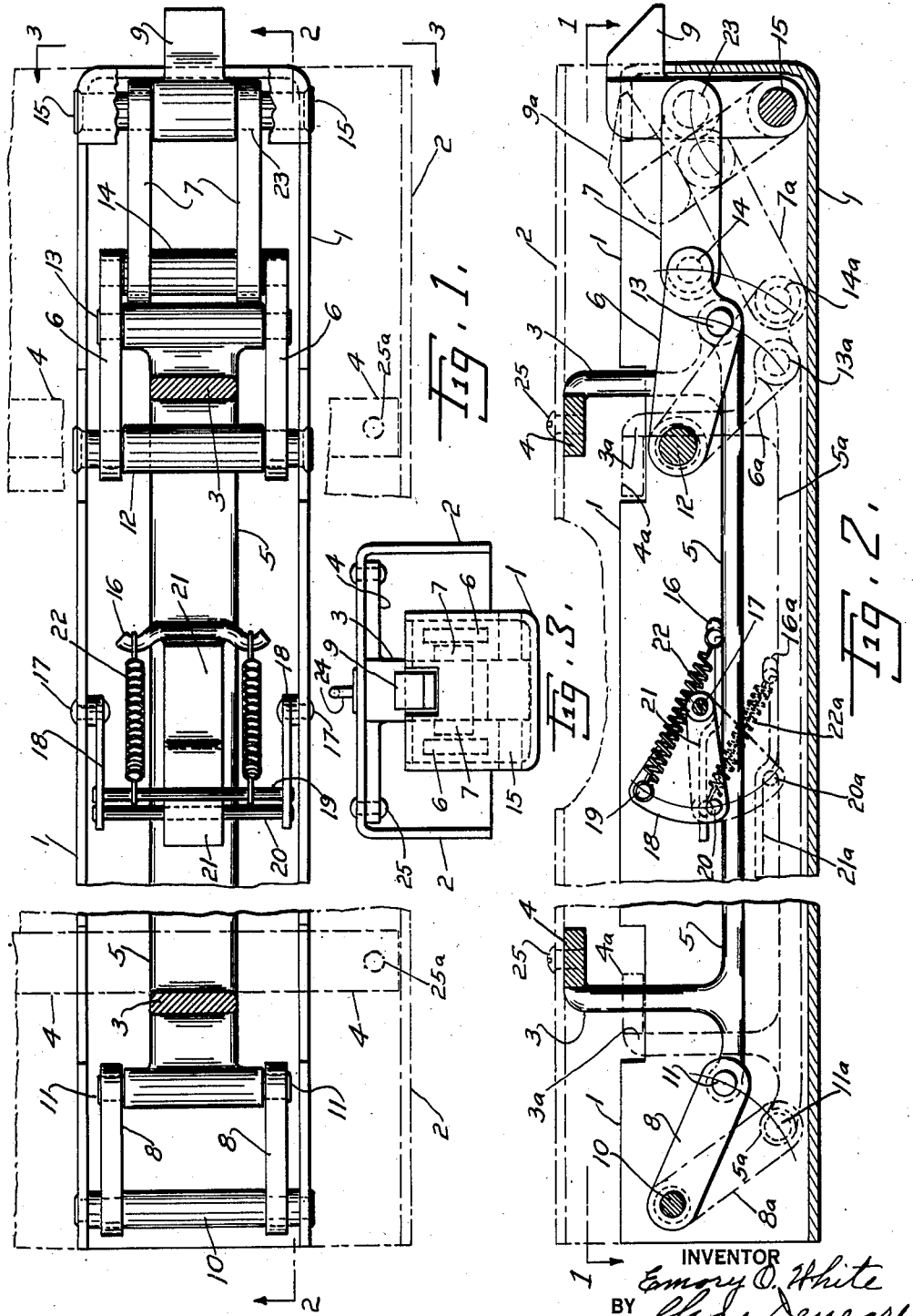
INVENTOR
Emory O. White
BY Chas. Denegre
ATTORNEY Sept. 7, 1943.                E. O. WHITE                2,328,936
                          EMERGENCY EXIT BOLT
                          Filed July 16, 1941           2 Sheets-Sheet 2
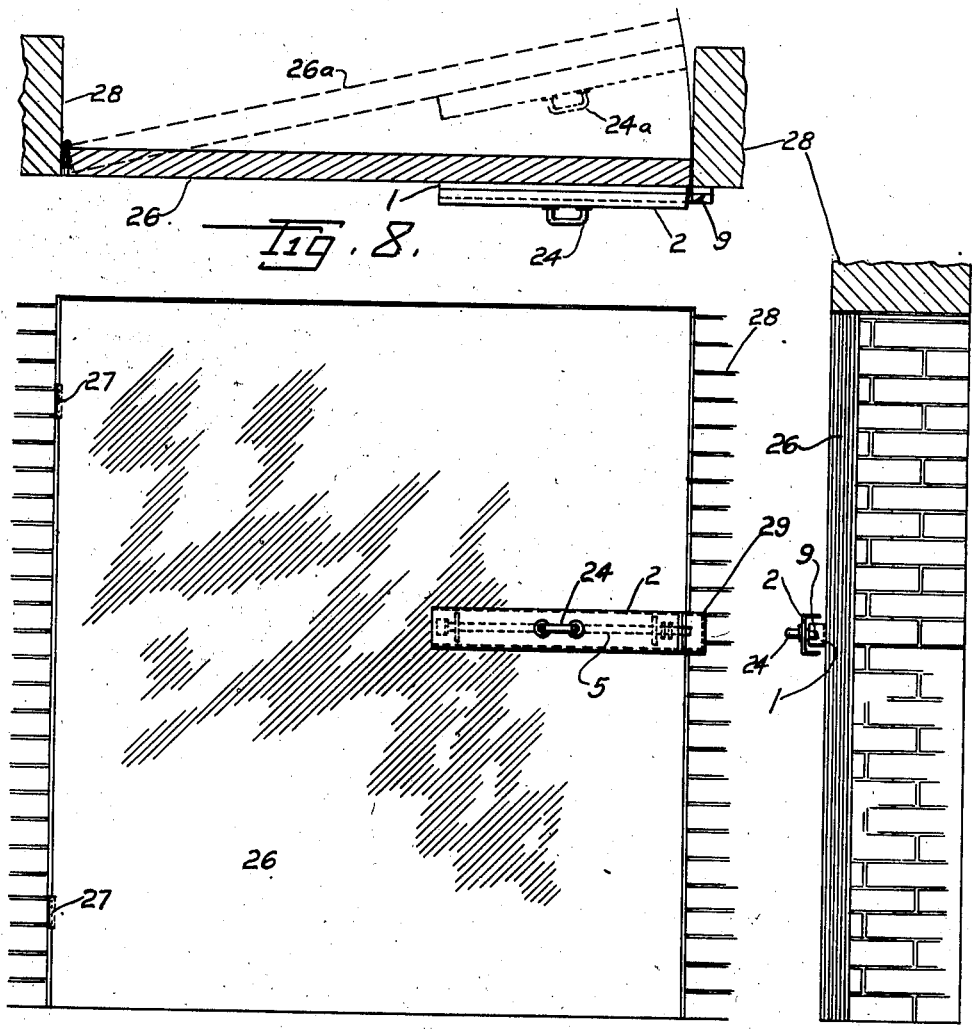
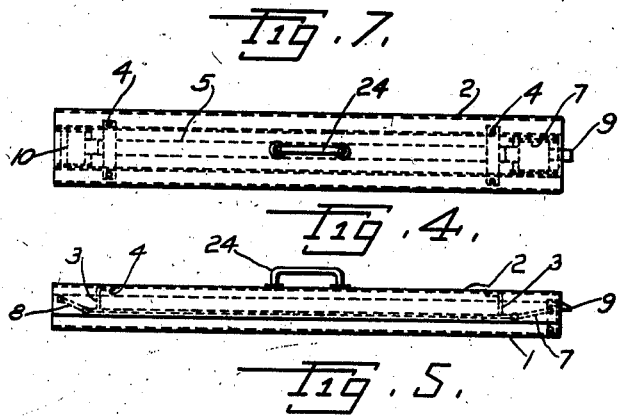
Emory O. White
INVENTOR
BY Chas. Denegre
ATTORNEY Patented Sept. 7, 1943

2,328,936

UNITED STATES PATENT OFFICE 2,328,936

EMERGENCY EXIT BOLT

Emory O. White, Albertville, Ala.

Application July 16, 1941, Serial No. 402,645

3 Claims. (Cl. 292—93)

This invention relates to bolt for emergency exits in theaters, meeting halls and the like, and has for its main object to provide such a bolt that is highly efficient, simple in construction, and most satisfactory for the purpose intended.

There are such bolts now in use but they are very much complicated, expensive to manufacture and rather difficult to maintain in satisfactory working condition.

By referring to the drawings, part of this application, it will be observed that Fig. 1 is a plan view of the assembled bolt with its cover removed on line 1—1 of Fig. 2; Fig. 2 is a sectional view in elevation on line 2—2 of Fig. 1; Fig. 3 is an end view on line 3—3 of Fig. 1; Fig. 4 is a top plan view of the bolt assembly that fits on the door; Fig. 5 is a side view of Fig. 4; Fig. 6 is an end view of Fig. 4; Fig. 7 is an elevation of a door and wall with bolt attached; Fig. 8 is a top plan view showing the door closed and partly open; Fig. 9 is an elevation of wall supporting part of bolt assembly on door frame.

Similar reference numerals refer to similar parts throughout the several views.

Again referring to the drawings it will be seen that the bolt assembly is mounted in a trough-like case 1. In one end there is an L shaped bolt that is on a shaft 15 which is held in place by bearing holes in the sides of the case 1. About the middle of the bolt member there is another shaft 23 to which two link connections 7 are attached and lead to another pair of links 6 through which a shaft 14 passes and also through the ends of the first pair of links 7. The second pair of links 6 have their other ends carried on a shaft 12 with its ends held in holes in each side of the case 1. The second set of links are provided with a hole in each off center on a line leading from the center of shaft 12 to the center of shaft 14. Through these holes a shaft 13 passes and carries an end of the main operating arm 5 of the device. At the opposite end of the case 1 the main operating arm 5 is swung in a pair of links 8 on a shaft 11 with the other ends of the links 8 supported on a shaft 10 that is held in place by its ends inserted in the sides of the case 1. About the middle of the main arm 5 a pair of coil springs 22 are mounted with one end of each attached to a bar 16 that is welded to main arm 5 with other ends of springs 22 attached to a bar 19 supported in a pair of V shaped arms 18 held on studs 17 in the sides of the case 1. The V shaped arms 18 are provided with a second bar 20 that is parallel with bar 19 with a flat member 21 as a means to hold the second bar 20 in close proximity to the main arm 5. Integral with the main arm 5 are two supports 3 with right angle ends 4 to which is attached the case cover 2 by means of screws 25 in screw holes 25a. A suitable handle 24 is attached to the outside of cover 2. Fig. 2 shows the bolt in locked position by reference to descriptive numerals 1 to 25 inclusive; and in unlocked position by reference to numerals 3a, 4a, 5a, 6a, 7a, 8a, 9a, 11a, 13a, 14a, 16a, 20a, 21a, 22a, and dotted lines. The unlocked position is caused by pressure exerted against cover 2 that shifts the bolt mechanism to unlocked position. In case of panic any pressure against the cover would unlock the door. The bolt becomes locked by pull on handle 24 attached to bolt assembly cover 2. The door 26 is carried on regular hinges 27 fastened to door frame 28. The bolt plunger or tongue is held in female part 29 lock on the door frame. In Fig. 8 the door is shown closed and partly open by dotted lines and 24a and 26a.

In operation the bolt is held in locked or unlocked position by means of the tension of the coil springs. When locked the springs pull the V shaped arm and hold the bolt assembly with the tongue extended. When pressure is exerted against the cover with sufficient force the tension of the springs is overcome and the V shaped arm is shifted beyond its pivot points thus allowing the tension of the springs to retain the tongue in unlocked position. To lock the bolt a pull on the handle overcomes the spring tension and shifts the V shaped arm. Both positions are clearly shown in Fig. 2.

The bolt assembly may be made out of any material best suited for the purpose.

While I have shown the preferred embodiment of my invention I do not wish to limit myself to the precise and exact details of structure but reserve the right to make any and all modifications and changes so long as I remain within the spirit and scope of the following claims.

Having described my invention I claim:

1. An emergency exit bolt comprising, an oblong enclosing case attached to a door, a main member mounted in said case and swung at each end on a pair of links supported on a shaft with bearings in the wall of said case, the tongue of said bolt being L shaped with the top of the L supported on a shaft with bearings in said case, and another shaft through said L shaped tongue, a pair of links attached to said second shaft of the tongue and leading to and connected to the pair of links at the locking end of said main member, said main member having two L shaped arms integral with said member, said L shaped arms having the cover of the bolt assembly attached by screw means, and a pair of coil springs attached to said main member and also attached to a V-shaped rocker arm, said rocker arm disposed to be held in two positions by means of said coil springs.

2. An emergency exit bolt comprising, a locking member L shaped mounted on a shaft through its inner end, a pair of links attached to a shaft passing through the mid section of said locking member, the other ends of said links attached to a shaft through a second pair of links, said second pair of links supporting an operating bar with its other end swung in a pair of links, said parts being enclosed in a trough-like case the walls of which support the fixed shafts in the assembly, a pair of coil springs mounted with two ends attached to said operating bar and the two other ends of the springs attached to a V-shaped rocker arm, the tension of said springs disposed to hold the bolt assembly in locked and unlocked position by manual force overcoming the spring tension, a cover attached to supporting arms integral with said operating bar, and handle means attached to said cover.

3. An emergency exit door bolt comprising, a trough-like case, an operating bar swung parallel in said case on shafts and links, said bar disposed to be moved inward and to the left from front by pressure exerted against it, and disposed to be moved outward and to the right from front by pull exerted on it, an L-shaped locking tongue mounted in one end of said case on a shaft passing through it and the walls of the case, a pair of links connecting said L-shaped tongue to a pair of links supporting an end of said operating bar, said L-shaped locking tongue disposed to move in unison with said operating bar, a pair of coil springs mounted with two of their ends attached to said operating bar and the other ends of the springs attached to a cross shaft carried in a pair of V-shaped rocker arms, the V-points of said arms carried on studs in the walls of the case, said springs and V-shaped arms disposed to hold the bolt assembly in locked position, and in unlocked position by manual force overcoming the tension of said springs; a cover over the internal parts in said case, said cover supported by integral arms of said operating bar, and a handle on said cover, said cover being parallel and equal in length with the trough-like case and disposed to act as trigger means for unlocking the bolt when pressure is exerted against said cover; said bolt assembly disposed to become locked when said handle and cover are pulled outward from the door.

EMORY O. WHITE.